(12) United States Patent
Bai et al.

(10) Patent No.: US 10,158,981 B2
(45) Date of Patent: Dec. 18, 2018

(54) METHOD AND DEVICE FOR PUSHING INFORMATION DURING CALL AND STORAGE MEDIUM

(71) Applicant: Baidu Online Network Technology (Beijing) Co., Ltd., Beijing (CN)

(72) Inventors: Kai Bai, Beijing (CN); Jun Li, Beijing (CN); Yunfeng Luo, Beijing (CN); Yinyin Jin, Beijing (CN); Jichao Han, Beijing (CN); Zicheng Pei, Beijing (CN); Jianding Luo, Beijing (CN); Jinglin Chen, Beijing (CN); Feng Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/122,628

(22) PCT Filed: Oct. 16, 2015

(86) PCT No.: PCT/CN2015/092067
§ 371 (c)(1),
(2) Date: Aug. 30, 2016

(87) PCT Pub. No.: WO2016/095604
PCT Pub. Date: Jun. 23, 2016

(65) Prior Publication Data
US 2017/0164166 A1 Jun. 8, 2017

(30) Foreign Application Priority Data

Dec. 19, 2014 (CN) .......................... 2014 1 0800317

(51) Int. Cl.
*H04W 4/12* (2009.01)
*H04L 29/06* (2006.01)
*H04L 29/08* (2006.01)

(52) U.S. Cl.
CPC .......... *H04W 4/12* (2013.01); *H04L 65/1083* (2013.01); *H04L 65/4061* (2013.01); *H04L 67/26* (2013.01)

(58) Field of Classification Search
CPC ....... H04L 65/4061; H04L 67/26; H04W 4/12
See application file for complete search history.

(56) References Cited

U.S. PATENT DOCUMENTS

| 2008/0108334 A1* | 5/2008 | Wang ................ H04M 3/42017 455/414.1 |
| 2011/0103570 A1* | 5/2011 | Gao .................. H04M 3/42017 379/207.16 |

(Continued)

FOREIGN PATENT DOCUMENTS

| CN | 101076151 A | 11/2007 |
| CN | 101076198 A | 11/2007 |

(Continued)

OTHER PUBLICATIONS

PCT/CN2015/092067 International Search Report dated Jan. 19, 2016 and English Translation, 4 pages.

*Primary Examiner* — Kashif Siddiqui
(74) *Attorney, Agent, or Firm* — Lathrop Gage LLP (57) ABSTRACT

Embodiments of the present application disclose a method, device and storage medium for pushing information during a call. The method for pushing information during a call includes: obtaining a recommendation information group pre-uploaded to a server by a peer user before the call is answered or hung up; determining a recommendation information category to be recommended according to a real-time state of a mobile terminal of a local user; and selecting (Continued)

recommendation information for recommending from the recommendation information group according to the recommendation information category. By means of the method, device and storage medium for pushing information during a call provided in the embodiments of the present application, the information recommending forms during a call are diversified.

15 Claims, 8 Drawing Sheets

(56) References Cited

U.S. PATENT DOCUMENTS

| | | |
|---|---|---|
| 2012/1965750 | 8/2012 | Hymel |
| 2014/0267553 A1* | 9/2014 | Lo .................. H04M 3/567 |
| | | 348/14.07 |
| 2017/0013241 A1 | 1/2017 | Qian et al. |

FOREIGN PATENT DOCUMENTS

| | | |
|---|---|---|
| CN | 102014161 A | 4/2011 |
| CN | 104540109 A | 4/2015 |

\* cited by examiner

METHOD AND DEVICE FOR PUSHING INFORMATION DURING CALL AND STORAGE MEDIUM

The present patent application claims the priority of Chinese Patent Application No. 201410800317.3, filed on Dec. 19, 2014, entitled "Method and Device For Pushing Information During Call" by Baidu Online Network Technology (Beijing) Co., Ltd., the entire disclosure of which is incorporated herein by reference.

TECHNICAL FIELD

Embodiments of the present disclosure relate to the field of communication technology, and in particular to a method, device for pushing information during a call and a storage medium.

BACKGROUND

As the communication technology develops, people start to place calls in contemporary information networks to complete increasingly more communication in their daily lives. Such calls include telephone calls in the wired telephone network, and voice calls and video calls in the mobile Internet.

In the prior art, the information recommendation during various calls is rather simplistic. Taking telephone calls in a wired telephone network as an example, the information that each involved party in the call can see is merely the telephone number of the other party before the answering party answers or hangs up the call.

SUMMARY

To this end, the embodiments of the present invention provide a method, device for pushing information during a call and a storage medium, in order to enrich the information recommending forms in the call process.

In a first aspect, a method for pushing information during a call is provided in one embodiment of the present application, including:
  obtaining a recommendation information group pre-uploaded to a server by a peer user before the call is answered or hung up;
  determining a recommendation information category to be recommended according to a real-time state of a mobile terminal of a local user; and
  selecting recommendation information for recommending from the recommendation information group according to the recommendation information category;
  wherein the local user is a calling party and the peer user is a called party; or the local user is a called party and the peer user is a calling party.

In a second aspect, a device for pushing information during a call is provided in one embodiment of the present application, including:
  a recommendation information group receiving module configured to obtain a recommendation information group pre-uploaded to a server by a peer user before the call is answered or hung up;
  a recommendation information category determining module configured to determine a recommendation information category to be recommended according to a real-time state of a mobile terminal of a local user; and
  an information recommending module configured to select recommendation information for recommending from the recommendation information group according to the recommendation information category;
  wherein the local user is a calling party and the peer user is a called party; or the local user is a called party and the peer user is a calling party.

In a third aspect, an embodiment of the present application provides a storage medium comprising one or more computer executable instructions, the one or more computer executable instructions when executed by a computer processor, causing the computer processor to perform a method for pushing information during a call, wherein the method includes:
  obtaining a recommendation information group pre-uploaded to a server by a peer user before the call is answered or hung up;
  determining a recommendation information category to be recommended according to a real-time state of a mobile terminal of a local user; and
  selecting recommendation information for recommending from the recommendation information group according to the recommendation information category;
  wherein the local user is a calling party and the peer user is a called party; or the local user is a called party and the peer user is a calling party.

According to the method and device for pushing information during a call provided in the embodiments of the present application and a storage medium, a recommendation information group pre-uploaded to a server by a peer user is obtained before the call is answered or hung up; a recommendation information category to be recommended is determined according to a real-time state of a mobile terminal of a local user; recommendation information for recommending is selected from the recommendation information group according to the recommendation information category, and thus the information recommending forms during a call are diversified.

BRIEF DESCRIPTION OF THE DRAWINGS

Other features, objectives, and advantages of the present application will become more apparent by reading detailed descriptions of non-limiting embodiments with reference to the following accompanying drawings.

DETAILED DESCRIPTION

The present disclosure will be further described below in detail in combination with the accompanying drawings and embodiments. It should be appreciated that the specific embodiments described herein are merely used for explaining this disclosure, rather than limiting the invention. Additionally, it should be noted that, for convenience of description, only parts related to this disclosure rather than the entire contents are shown in the accompanying drawings.

First Embodiment

Figure 1:
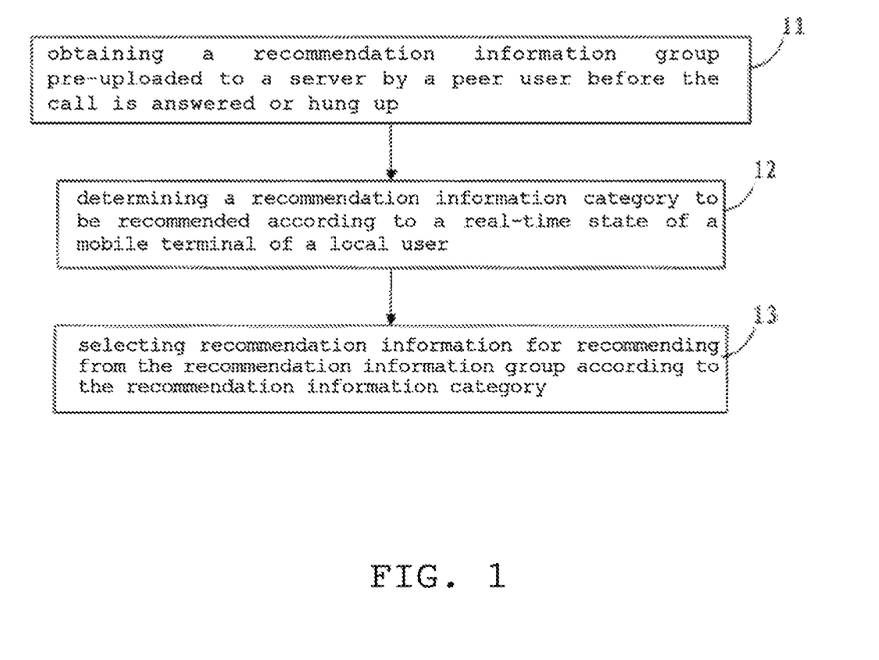
FIG. 1 is a flowchart of a method for pushing information during a call provided in a first embodiment of the disclosure.

FIG. 1 is a flowchart of a method for pushing information during a call provided in a first embodiment of the disclosure. The method for pushing information during a call includes:

Operation 11: A recommendation information group pre-uploaded to a server by a peer user is obtained before the call is answered or hung up.

The so-called call in the embodiment may be a telephone call in a wired telephone network, a telephone call in a mobile communication network, and a voice call or a video call in the mobile Internet.

Participants involved in each call include a calling party and a called party. In the embodiment, the local user may be the calling party; and accordingly the peer user is the called party. Alternatively, the local user is the called party, and correspondingly the peer user is the calling party.

Before the call is started, each user uploads her own relevant information to a server. Since the own relevant information will be recommended to other users in the network, it is referred to as a recommendation information group.

The recommendation information group usually includes a group of information in different storage formats. For example, the recommendation information group may include both picture information and text information, and may also include webpage information. For an individual user, the recommendation information group uploaded by he/her may be the information showing his/her recent status, for example, a text "I feel bad today," or the information showing his/her interests and hobbies, for example, his/her favorite music. For an enterprise user, the recommendation information group uploaded by the enterprise user may be its own organization introduction information or product promotion information.

The server may be a single server, or a server cluster composed of a plurality of servers. The server is dedicated to receive and store the recommendation information groups uploaded by different users.

Operation 12: A recommendation information category to be recommended is determined according to a real-time state of a mobile terminal of a local user.

It can be appreciated that the recommendation information group generally includes different categories of information. For example, the recommendation information group may include both a text and a picture showing the recent status of an individual user.

When recommendation information in the recommendation information group is recommended to the local user, the recommendation information may be selected for recommending according to the recommendation information category included in the recommendation information group on the basis of the real-time state of the mobile terminal used by the local user.

The real-time state may be the hardware configuration condition of the mobile terminal, for example, whether an earphone is plugged in the mobile terminal. The real-time state may also be real-time detection information of the mobile terminal, for example, a distance between the mobile terminal and an obstacle in front of it.

The recommendation information category may be a picture category, a text category, a voice category or a webpage category.

Operation 13: Recommendation information for recommending is selected from the recommendation information group according to the recommendation information category.

After the recommendation information category is determined, the recommendation information is selected for recommending from the recommendation information group according to the recommendation information category. For example, assuming that the recommendation information category is the picture category, the recommendation information with picture category is selected to be recommended from the recommendation information group.

Figure 2:
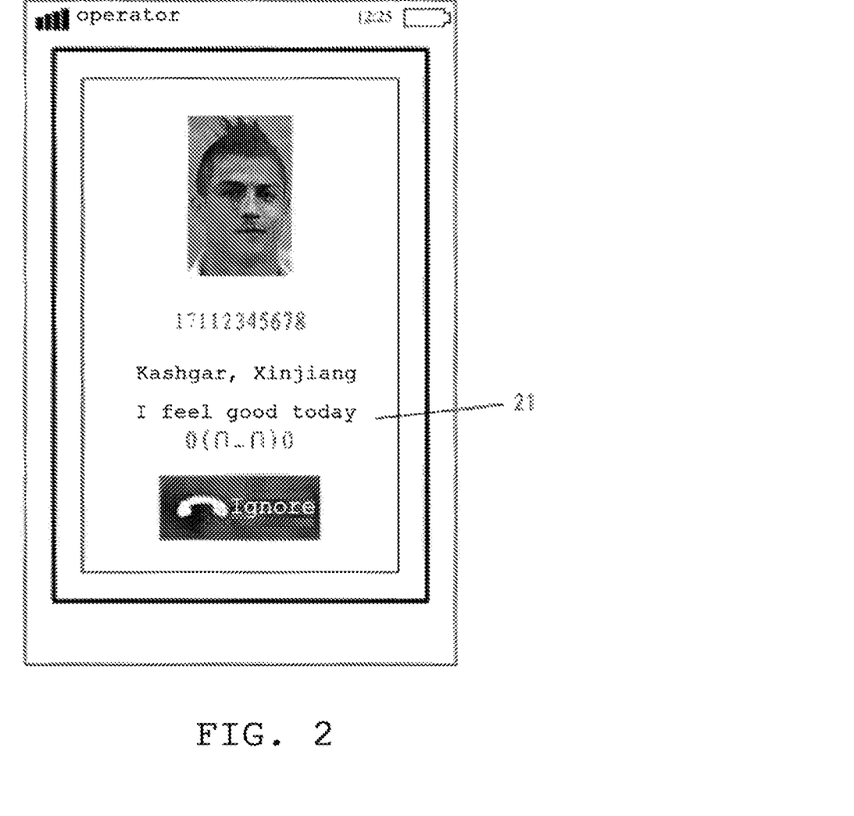
FIG. 2 shows a diagram of an information pushing display interface provided in the first embodiment.

FIG. 2 shows a diagram of an information pushing display interface provided in the embodiment. Referring to FIG. 2, the text information 21 showing the recent status of the peer user is displayed on the information pushing display interface.

According to the embodiment, a recommendation information group pre-uploaded to a server by a peer user is obtained before the call is answered or hung up; a recommendation information category to be recommended is determined according to a real-time state of a mobile terminal of a local user; and recommendation information for recommending is selected from the recommendation information group according to the recommendation information category, and thus the information recommending forms during a call are diversified.

Second Embodiment

Figure 3:
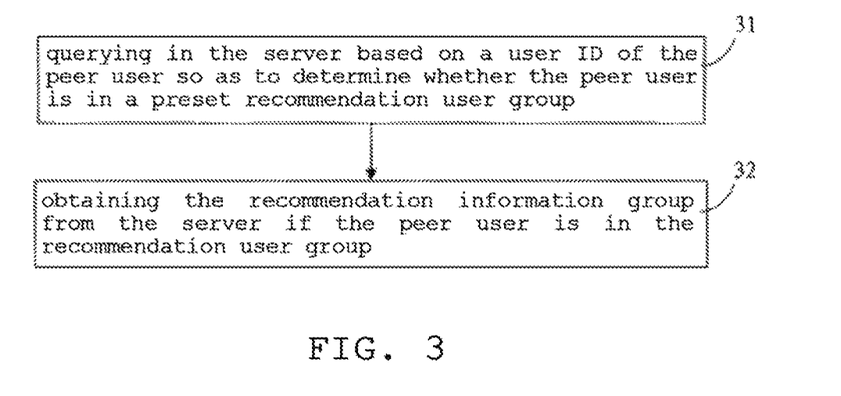
FIG. 3 is a flowchart of receiving a recommendation information group in a method for pushing information during a call provided in a second embodiment of the disclosure.

FIG. 3 is a flowchart of receiving a recommendation information group in a method for pushing information during a call provided in a second embodiment of the disclosure. The method for pushing information during a call is on the basis of the above-mentioned embodiment of the disclosure. Further, the obtaining of a recommendation information group pre-uploaded to a server by a peer user includes: querying in the server based on a user ID of the peer user so as to determine whether the peer user is in a preset recommendation user group; and obtaining the recommendation information group from the server if the peer user is in the recommendation user group.

Referring to FIG. 3, the obtaining of a recommendation information group pre-uploaded to a server by a peer user includes: an operation 31 and an operation 32.

Operation 31: A query in the server is placed based on a user ID of the peer user so as to determine whether the peer user is in a preset recommendation user group.

In the embodiment, the local user stores the preset recommendation user group in the server. The recommendation user group includes a user ID list of peer users whose recommendation information groups are allowed to be received. The user ID is an identifier of a user, which uniquely identifies the user in the whole network.

Specifically, the user ID of the peer user may be the telephone number of the peer user, or the user name of the peer user. After the user ID of the peer user is received, a query in the server is placed based on a user ID of the peer user so as to determine whether the peer user is in a preset recommendation user group.

Operation 32: The recommendation information group is obtained from the server if the peer user is in the recommendation user group.

By querying in the server, if the peer user is in the recommendation user group, the recommendation information group of the peer user is obtained from the server.

According to the embodiment, by querying in the server based on a user ID of the peer user so as to determine whether the peer user is in a preset recommendation user group and obtaining the recommendation information group from the server if the peer user is in the recommendation user group, it is determined whether to obtain the user information group of the peer user, according to the recommendation user group preset on the server by the local user; which may improve the security of information recommendation.

Third Embodiment

Figure 4:
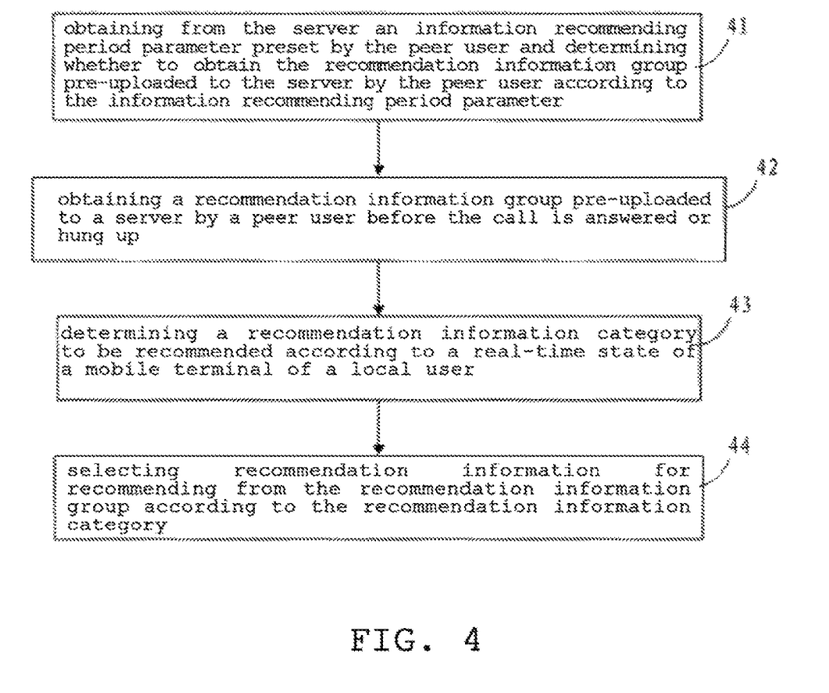
FIG. 4 is a flowchart of a method for pushing information during a call provided in a third embodiment of the disclosure.

FIG. 4 is a flowchart of a method for pushing information during a call provided in a third embodiment of the disclosure. The method for pushing information during a call is on the basis of the above-mentioned embodiments of the disclosure, before the recommendation information group pre-uploaded to the server by the peer user is obtained, the method further includes: obtaining from the server an information recommending period parameter preset by the peer user and determining whether to obtain the recommendation information group pre-uploaded to the server by the peer user according to the information recommending period parameter.

Referring to FIG. 4, the method for pushing information during a call includes: operations 41 to 44.

Operation 41: An information recommending period parameter preset by the remote user is obtained from the server, and it is determined whether to obtain the recommendation information group pre-uploaded to the server by the peer user according to the information recommending period parameter. The local user may also set the information recommending period parameter on the server. The information recommending period parameter is used for specifying a period during which the local user would obtain the recommendation information group of the peer user. For example, if the local user needs to receive the recommendation information group of the peer user between 8 am and 6 pm every day, the local user may set the information recommending period parameter to be from 8 am to 6 pm.

Operation 42: A recommendation information group pre-uploaded to a server by a peer user is obtained before the call is answered or hung up.

Operation 43: A recommendation information category to be recommended is determined according to a real-time state of a mobile terminal of a local user.

Operation 44: Recommendation information for recommending is selected from the recommendation information group according to the recommendation information category.

According to the embodiment, by obtaining from the server an information recommending period parameter preset by the peer user and determining whether to obtain the recommendation information group pre-uploaded to the server by the peer user according to the information recommending period parameter, before the recommendation information group pre-uploaded to the server by the peer user is obtained, the user may determine whether to receive the recommendation information group of the peer user according to the preset information recommending period parameter, which may avoid the disturbance to the user caused by the recommended information.

Fourth Embodiment

Figure 5:
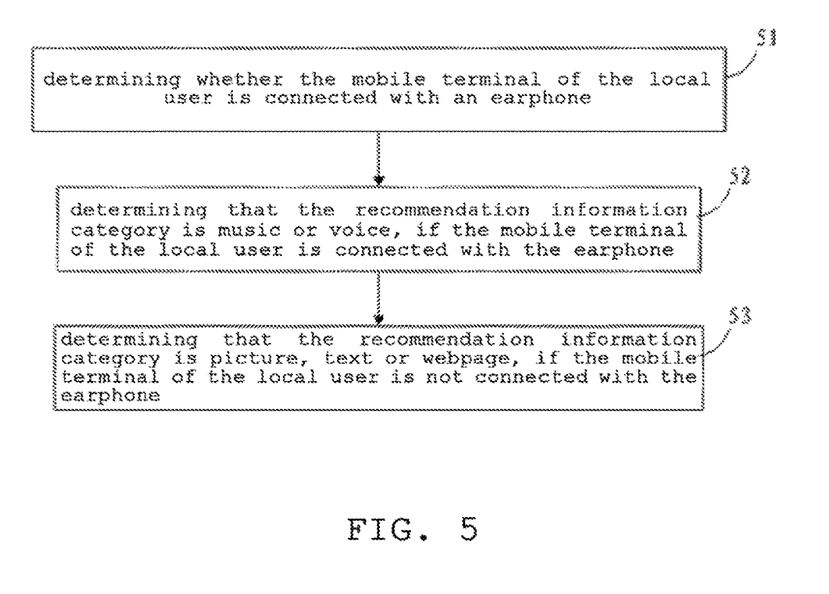
FIG. 5 is a flowchart of determining a recommendation information category in a method for pushing information during a call provided in a fourth embodiment of the disclosure.

FIG. 5 is a flowchart of determining a recommendation information category in a method for pushing information during a call provided in a fourth embodiment of the disclosure. The method for pushing information during a call is on the basis of the above-mentioned embodiments of the disclosure. Further, the determining of a recommendation information category to be recommended according to a real-time state of a mobile terminal of a local user includes: determining whether the mobile terminal of the local user is connected with an earphone; determining that the recommendation information category is music or voice if the mobile terminal of the local user is connected with an earphone; and determining that the recommendation information category is picture, text or webpage if the mobile terminal of the local user is not connected with an earphone.

Referring to FIG. 5, the determining of a recommendation information category to be recommended according to a real-time state of a mobile terminal of a local user includes: operations 51 to 53.

Operation 51: It is determined whether the mobile terminal of the local user is connected with an earphone.

Generally, if the mobile terminal used by the local user is connected with an earphone, the local user will intend to receive the recommended information in the form of sound. Hence, when the real-time state of the local user is to be determined, it is determined whether the mobile terminal of the local user is connected with an earphone.

Operation 52: It is determined that the recommendation information category is music or voice, if the mobile terminal of the local user is connected with an earphone.

If the mobile terminal of the local user is connected with an earphone, the recommended information obtained from the recommendation information group is the recommended information in the form of sound. Specifically, the recommended information in the form of sound includes music or voice.

Operation 53: It is determined that the recommendation information category is picture, text or webpage, if the mobile terminal of the local user is not connected with an earphone.

If the mobile terminal of the local user is not connected with an earphone, the recommended information in the form of picture, text or webpage, rather than the recommended information in the form of sound, is obtained from the recommendation information group.

According to the embodiment, it is realized that the recommendation information category is determined according to the real-time state of the mobile terminal, by determining whether the mobile terminal of the local user is connected with an earphone. It is determined that the recommendation information category is music or voice if the mobile terminal of the local user is connected with an earphone; and it is determined that the recommendation information category is picture, text or webpage if the mobile terminal of the local user is not connected with an earphone.

Fifth Embodiment

Figure 6:
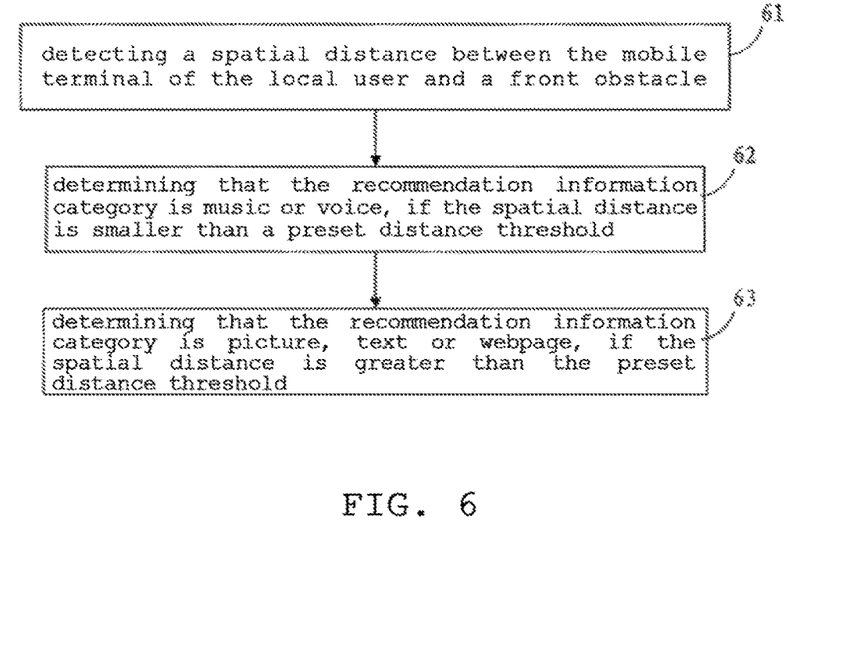
FIG. 6 is a flowchart of determining a recommendation information category in a method for pushing information during a call provided in a fifth embodiment of the disclosure.

FIG. 6 is a flowchart of determining a recommendation information category in a method for pushing information during a call provided in a fifth embodiment of the disclosure. The method for pushing information during a call is on the basis of the above-mentioned embodiments of the disclosure. Further, the determining of a recommendation information category to be recommended according to a real-time state of a mobile terminal of a local user includes: detecting a spatial distance between the mobile terminal of the local user and a front obstacle; determining that the recommendation information category is music or voice if the spatial distance is smaller than a preset distance threshold; and determining that the recommendation information category is picture, text or webpage if the spatial distance is greater than the preset distance threshold.

Referring to FIG. 6, the determining of a recommendation information category to be recommended according to a real-time state of a mobile terminal of a local user includes: operations 61 to 63.

Operation 61: A spatial distance between the mobile terminal of the local user and a front obstacle is detected.

At present, most mobile terminals are equipped with distance sensors. The distance sensor is able to sense the spatial distance between the mobile terminal and an obstacle in front of it. When the local user dials or answers a call, the mobile terminal is able to detect the distance between the mobile terminal and the local user by using its own distance sensor. Operation 62: It is determined that the recommendation information category is music or voice, if the spatial distance is smaller than a preset distance threshold.

Generally, when the mobile terminal is spatially close to the local user, the user will intend to receive the recommended information in the form of sound. Hence, when the spatial distance is smaller than a preset distance threshold, the recommendation information category is determined as music or voice.

Operation 63: It is determined that the recommendation information category is picture, text or webpage, if the spatial distance is greater than the preset distance threshold.

Accordingly, if the mobile terminal is spatially far from the local user, the user will intend to receive other recommended information than the recommended information in the form of sound. Hence, when the spatial distance is greater than the preset distance threshold, the recommendation information category is determined as picture, text or webpage.

According to the embodiment, it is realized that the recommendation information category is determined according to the real-time state of the mobile terminal by detecting a spatial distance between the mobile terminal of the local user and a front obstacle. It is determined that the recommendation information category is music or voice if the spatial distance is smaller than a preset distance threshold; and it is determined that the recommendation information category is picture, text or webpage if the spatial distance is greater than the preset distance threshold.

Sixth Embodiment

Figure 7:
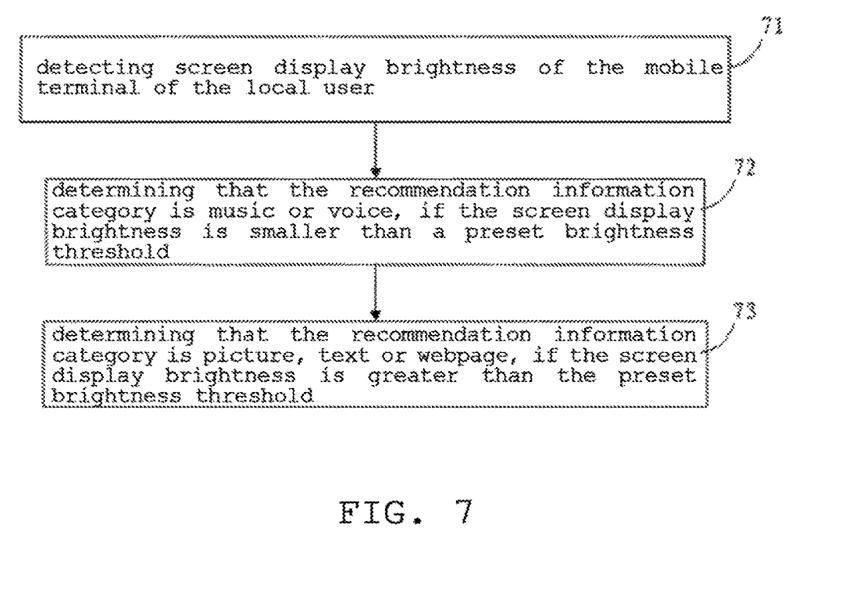
FIG. 7 is a flowchart of determining a recommendation information category in a method for pushing information during a call provided in a sixth embodiment of the disclosure.

FIG. 7 is a flowchart of determining a recommendation information category in a method for pushing information during a call provided in a sixth embodiment of the disclosure. The method for pushing information during a call is on the basis of the above-mentioned embodiments of the disclosure. Further, the determining of a recommendation information category to be recommended according to a real-time state of a mobile terminal of a local user includes: detecting screen display brightness of the mobile terminal of the local user; determining that the recommendation information category is music or voice if the screen display brightness is smaller than a preset brightness threshold; and determining that the recommendation information category is picture, text or webpage if the screen display brightness is greater than the preset brightness threshold.

Referring to FIG. 7, the determining of a recommendation information category to be recommended according to a real-time state of a mobile terminal of a local user includes the following operations.

Operation 71: Screen display brightness of the mobile terminal of the local user is detected.

When the recommendation information category is determined based on the real-time state of the mobile terminal, the recommendation information category may also be determined based on the screen display brightness of the mobile terminal. Operation 72: It is determined that the recommendation information category is music or voice, if the screen display brightness is smaller than a preset brightness threshold. If the screen display brightness is smaller than the preset brightness threshold, it means that the screen is relatively dark. In this case, the recommended information in the form of sound, such as music and voice, may be recommended.

Operation 73: It is determined that the recommendation information category is picture, text or webpage, if the screen display brightness is greater than the preset brightness threshold.

If the screen display brightness is greater than the preset brightness threshold, it means that the screen is relatively bright. In this case, the picture, text or webpage may be recommended to the local user.

According to the embodiment, it is realized that the recommendation information category is determined according to the real-time state of the mobile terminal by detecting screen display brightness of the mobile terminal of the local user. It is determined that the recommendation information category is music or voice if the screen display brightness is smaller than a preset brightness threshold; and it is determined that the recommendation information category is picture, text or webpage if the screen display brightness is greater than the preset brightness threshold.

Seventh Embodiment

Figure 8:
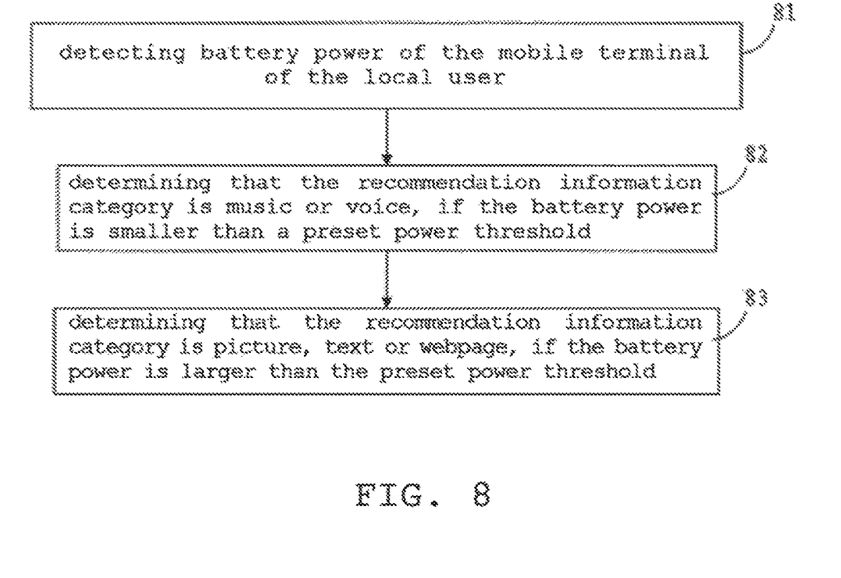
FIG. 8 is a flowchart of determining a recommendation information category in a method for pushing information during a call provided in a seventh embodiment of the disclosure.

FIG. 8 is a flowchart of determining a recommendation information category in a method for pushing information during a call provided in a seventh embodiment of the disclosure. The method for pushing information during a call is on the basis of the above-mentioned embodiments of the disclosure. Further, the determining of a recommendation information category to be recommended according to a real-time state of a mobile terminal of a local user includes: detecting battery power of the mobile terminal of the local user; determining that the recommendation information category is music or voice if the battery power is smaller than a preset power threshold; and determining that the recommendation information category is picture, text or webpage if the battery power is greater than the preset power threshold.

Referring to FIG. 8, the determining of a recommendation information category to be recommended according to a real-time state of a mobile terminal of a local user includes operations 81 to 83.

Operation 81: Battery power of the mobile terminal of the local user is detected.

When the recommendation information category is determined based on the real-time state of the mobile terminal, the recommendation information category may also be determined based on the battery power of the mobile terminal.

Operation 82: It is determined that the recommendation information category is music or voice, if the battery power is smaller than a preset power threshold.

When the battery power is smaller than the preset power threshold, the recommendation information category is determined as music or voice.

Operation 83: It is determined that the recommendation information category is picture, text or webpage, if the battery power is greater than the preset power threshold.

When the battery power is greater than the preset power threshold, the recommendation information category is determined as picture, text or webpage.

According to the embodiment, it is realized that the recommendation information category is determined based on the real-time state of the mobile terminal by detecting battery power of the mobile terminal of the local user. It is determined that the recommendation information category is music or voice if the battery power is smaller than a preset power threshold; and it is determined that the recommendation information category is picture, text or webpage if the battery power is greater than the preset power threshold.

Eighth Embodiment

Figure 9:
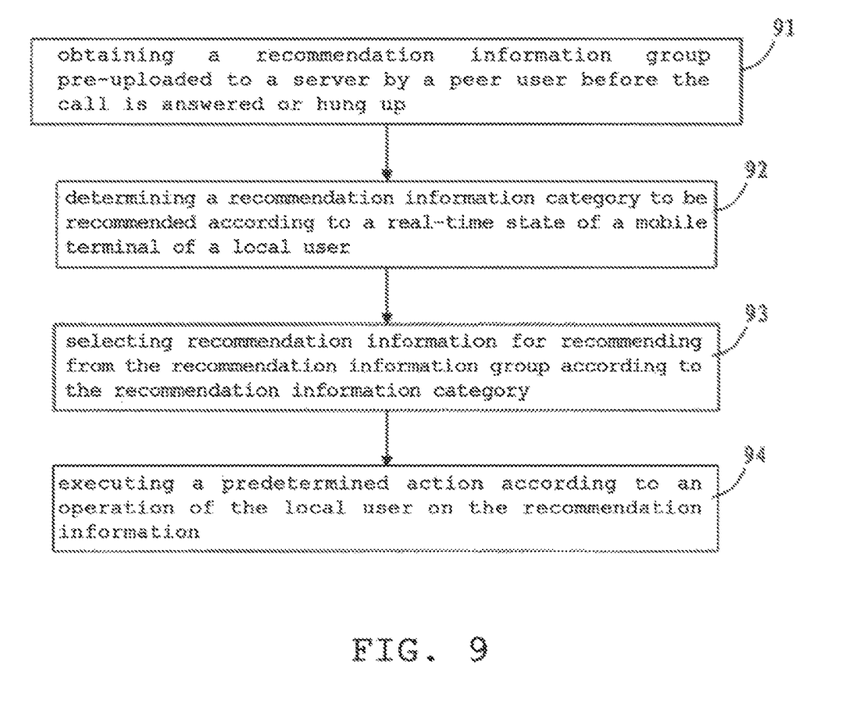
FIG. 9 is a flowchart of a method for pushing information during a call provided in an eighth embodiment of the disclosure.

FIG. 9 is a flowchart of a method for pushing information during a call provided in an eighth embodiment of the disclosure. The method for pushing information during a call is on the basis of the above-mentioned embodiments of the disclosure. After selecting recommendation information for recommending from the recommendation information group according to the recommendation information category, the method further includes executing a predetermined action according to an operation of the local user on the recommendation information. Referring to FIG. 9, the method for pushing information during a call includes: operations 91 to 94.

Operation 91: A recommendation information group pre-uploaded to a server by a peer user is obtained before the call is answered or hung up.

Operation 92: A recommendation information category to be recommended is determined according to a real-time state of a mobile terminal of a local user.

Operation 93: Recommendation information for recommending is selected from the recommendation information group according to the recommendation information category.

Operation 94: A predetermined action is executed according to an operation of the local user on the recommendation information.

After the recommended information is pushed to the local user, the mobile terminal executes a predetermined action according to an operation of the local user on the recommendation information. The predetermined action may be downloading a coupon, putting merchandise into the shopping cart, and/or adding the peer user as a friend.

Figure 10A:
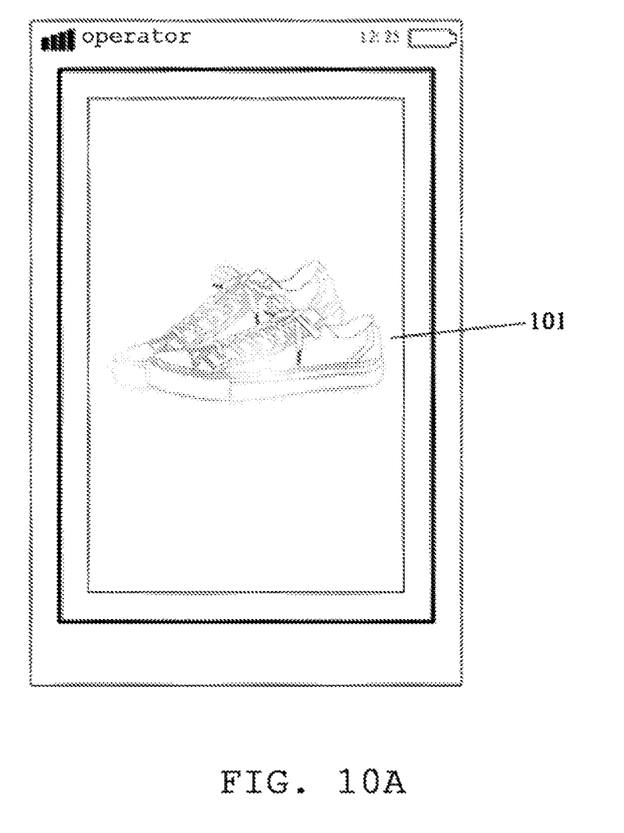
FIG. 10A shows a display interface for previewing merchandise provided in the eighth embodiment of the disclosure.
Figure 10B:
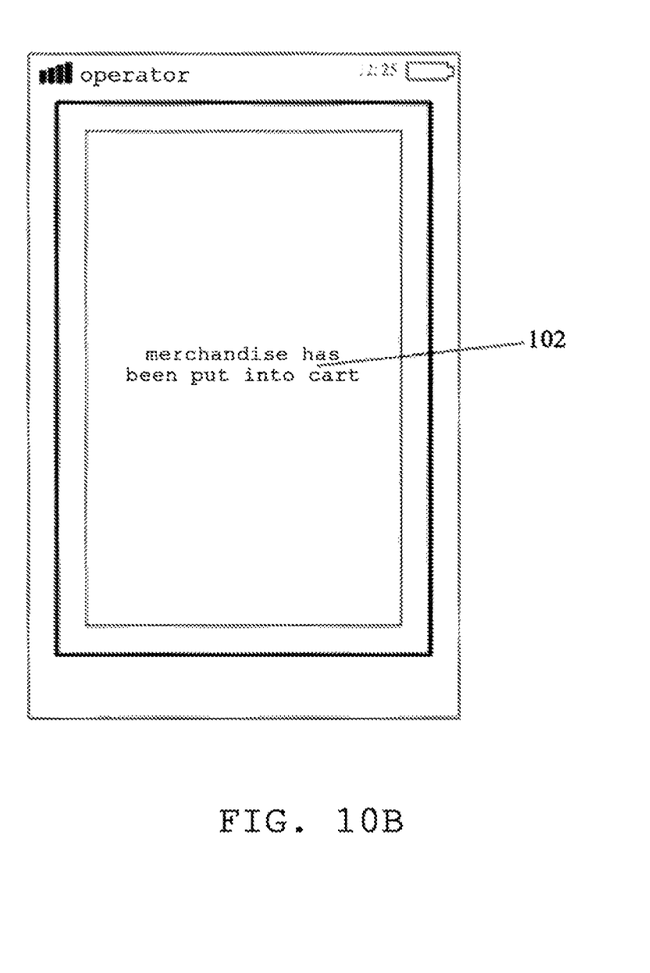
FIG. 10B shows a display interface for a prompting message provided in the eighth embodiment of the disclosure.

FIG. 10A and FIG. 10B show display interfaces of executing predetermined actions. Referring to FIG. 10A, merchandise 101 is displayed on the display interface. After the user clicks the merchandise, the merchandise is put into the shopping cart. Referring to FIG. 10B, a prompt message 102 for putting the merchandise into the shopping cart is displayed on the display interface.

According to the embodiment, by executing a predetermined action according to an operation of the local user on the recommendation information after selecting recommendation information for recommending from the recommendation information group according to the recommendation information category, the operability of the recommended information is enhanced.

Ninth Embodiment

Figure 11:
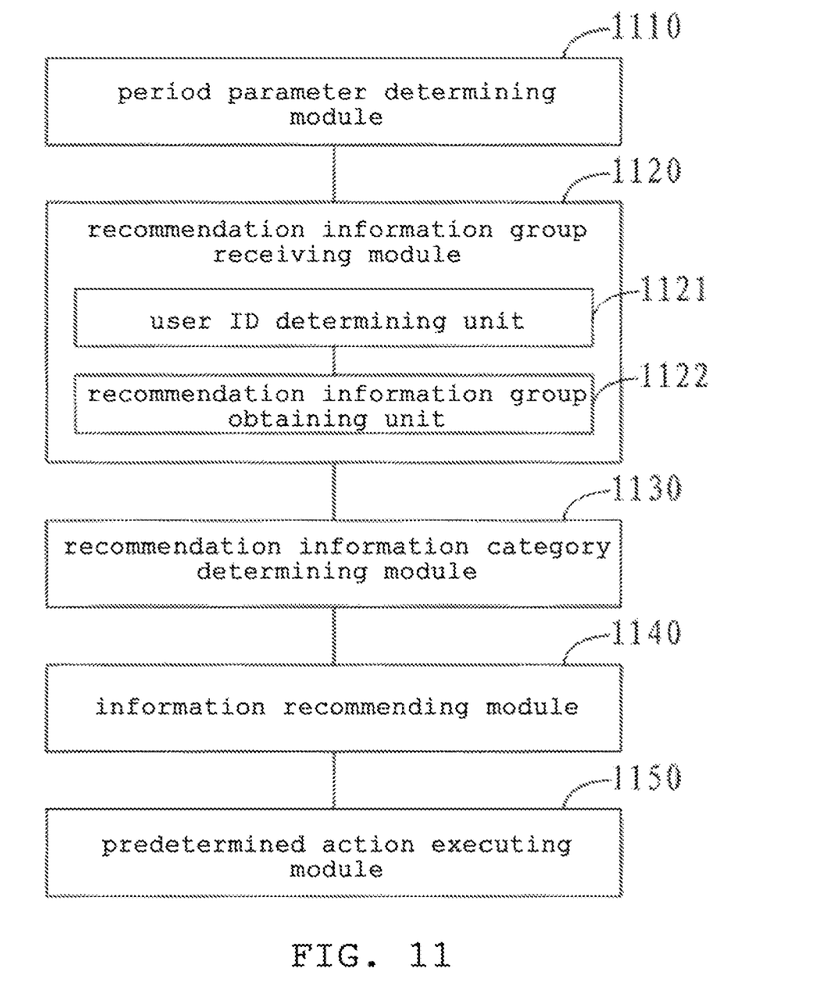
FIG. 11 is a structure diagram of a device for pushing information during a call provided in a ninth embodiment of the disclosure.

FIG. 11 is a structure diagram of a device for pushing information during a call provided in a ninth embodiment of the disclosure. Referring to FIG. 11, the device for pushing information during a call includes: a recommendation information group receiving module 1120, a recommendation information category determining module 1130, and an information recommending module 1140.

The recommendation information group receiving module 1120 is configured to obtain a recommendation information group pre-uploaded to a server by a peer user before the call is answered or hung up.

The recommendation information category determination module 1130 is configured to determine a recommendation information category to be recommended according to a real-time state of a mobile terminal of a local user.

The information recommending module 1140 is configured to select recommendation information for recommending from the recommendation information group according to the recommendation information category.

The local user is a calling party and the peer user is a called party; or the local user is a called party and the peer user is a calling party.

Further, the recommendation information group receiving module 1120 includes: a user ID determining unit 1121 and a recommendation information group obtaining unit 1122.

The user ID determining unit 1121 is configured to query in the server based on a user ID of the peer user so as to determine whether the peer user is in a preset recommendation user group.

The recommendation information group obtaining unit 1122 is configured to obtain the recommendation information group from the server when the peer user is in the recommendation user group.

Further, the device for pushing information during a call includes: a period parameter determining module 1110.

The period parameter determining module 1110 is configured to obtain from the server an information recommending period parameter preset by the peer user and determine whether to obtain the recommendation information group pre-uploaded to the server by the peer user according to the information recommending period parameter, before the recommendation information group pre-uploaded to the server by the peer user is obtained.

Further, the recommendation information category determining module 1120 is specifically configured to:
  determine whether the mobile terminal of the local user is connected with an earphone;
  determine that the recommendation information category is music or voice, if the mobile terminal of the local user is connected with an earphone; and determine that the recommendation information category is picture, text or webpage, if the mobile terminal of the local user is not connected with an earphone.

Further, the recommendation information category determining module 1120 is specifically configured to:

detect a spatial distance between the mobile terminal of the local user and a front obstacle;

determine that the recommendation information category is music or voice, if the spatial distance is smaller than a preset distance threshold; and determine that the recommendation information category is picture, text or webpage, if the spatial distance is greater than the preset distance threshold.

Further, the recommendation information category determining module 1120 is specifically configured to:

detect screen display brightness of the mobile terminal of the local user;

determine that the recommendation information category is music or voice, if the screen display brightness is smaller than a preset brightness threshold; and determine that the recommendation information category is picture, text or webpage, if the screen display brightness is greater than the preset brightness threshold.

Further, the recommendation information category determining module 1120 is specifically configured to:

detect battery power of the mobile terminal of the local user;

determine that the recommendation information category is music or voice, if the battery power is smaller than a preset power threshold; and determine that the recommendation information category is picture, text or webpage, if the battery power is greater than the preset power threshold.

Further, the device for pushing information during a call also includes: a predetermined action executing module 1150.

The predetermined action executing module 1150 is configured to execute a predetermined action according to an operation of the user on the recommendation information, after the recommendation information is selected for recommending from the recommendation information group according to the recommendation information category.

The above-described device is capable of performing the method for pushing information during a call provided in any embodiment of the disclosure, has corresponding functional modules for performing the method, and achieves beneficial effects from performing the method.

Tenth Embodiment

The embodiment provides a non-transitory computer storage medium storing one or more modules, which when executed by a terminal performing the method for pushing information during a call, cause the terminal to:

obtain a recommendation information group pre-uploaded to a server by a peer user before the call is answered or hung up;

determine a recommendation information category to be recommended according to a real-time state of a mobile terminal of a local user; and select recommendation information for recommending from the recommendation information group according to the recommendation information category;

wherein the local user is a calling party and the peer user is a called party; or the local user is a called party and the peer user is a calling party.

When the modules stored in the storage medium are executed by the terminal, the obtaining a recommendation information group pre-uploaded to a server by a peer user may preferably include:

querying in the server based on a user ID of the peer user so as to determine whether the peer user is in a preset recommendation user group; and obtaining the recommendation information group from the server if the peer user is in the recommendation user group.

When the modules stored in the storage medium are executed by the terminal, the terminal is preferably caused to:

obtain from the server an information recommending period parameter preset by the peer user and determine whether to obtain the recommendation information group pre-uploaded to the server by the peer user according to the information recommending period parameter, before obtaining the recommendation information group pre-uploaded to the server by the peer user.

When the modules stored in the storage medium are executed by the terminal, the determining a recommendation information category to be recommended according to a real-time state of a mobile terminal of a local user may preferably include:

determining whether the mobile terminal of the local user is connected with an earphone;

determining that the recommendation information category is music or voice, if the mobile terminal of the local user is connected with the earphone; and determining that the recommendation information category is picture, text or webpage, if the mobile terminal of the local user is not connected with the earphone.

When the modules stored in the storage medium are executed by the terminal, the determining a recommendation information category to be recommended according to a real-time state of a mobile terminal of a local user may preferably include:

detecting a spatial distance between the mobile terminal of the local user and a front obstacle;

determining that the recommendation information category is music or voice, if the spatial distance is smaller than a preset distance threshold; and determining that the recommendation information category is picture, text or webpage, if the spatial distance is greater than the preset distance threshold.

When the modules stored in the storage medium are executed by the terminal, the determining of a recommendation information category to be recommended according to a real-time state of a mobile terminal of a local user may preferably include:

detecting screen display brightness of the mobile terminal of the local user;

determining that the recommendation information category is music or voice, if the screen display brightness is smaller than a preset brightness threshold; and determining that the recommendation information category is picture, text or webpage, if the screen display brightness is greater than the preset brightness threshold.

When the modules stored in the storage medium are executed by the terminal, the determining a recommendation information category to be recommended according to a real-time state of a mobile terminal of a local user may preferably include:

detecting battery power of the mobile terminal of the local user;

determining that the recommendation information category is music or voice, if the battery power is smaller than a preset power threshold; and determining that the recommendation information category is picture, text or webpage, if the battery power is greater than the preset power threshold.

When the modules stored in the storage medium are executed by the terminal, the terminal is preferably caused to: executing a predetermined action according to an operation of the local user on the recommendation information after selecting recommendation information for recommending from the recommendation information group according to the recommendation information category.

The sequence numbers of the above embodiments of the disclosure are merely for description, and do not represent the superiority of the embodiments.

It should be understood by a person skilled in the art that the modules or the steps of the disclosure mentioned above may be realized by means of universal computing device(s). They may be integrated into a single computing device, or distributed on a network composed of a plurality of computing devices. Alternatively, they may be realized by means of computer executable program codes, and thus may be stored in storage devices and executed by the computing devices. Or, they may be respectively made into various integrated circuit modules, or a plurality of modules or steps among them are manufactured as a single integrated circuit module. In this way, the present application is not limited to any specific combination of hardware and software.

The embodiments in this description are described progressively. The emphasis of description of each embodiment is its difference from the other embodiments, and the embodiments may share their same or similar parts.

The forgoing descriptions are merely preferred embodiments of the present application, and not intended to limit the present invention. For a person skilled in the art, various modifications and variations can be made to the present application. Any modification, equivalent substitution, improvement, and the like made within the concept and principle of the present application should fall into the protection scope of the present application.

What is claimed is:

1. A method for pushing information during a call, comprising:
   obtaining a recommendation information group pre-uploaded to a server by a peer user before the call is answered or hung up;
   identifying a real-time state of a mobile terminal of a local user;
   determining a recommendation information category to be recommended according to the identified real-time state of the mobile terminal of the local user; and
   selecting recommendation information for recommending from the recommendation information group according to the recommendation information category;
   wherein the local user is a calling party and the peer user is a called party; or the local user is a called party and the peer user is a calling party,
   wherein the determining a recommendation information category to be recommended according to a real-time state of a mobile terminal of a local user comprises:
   detecting battery power of the mobile terminal of the local user;
   determining that the recommendation information category is music or voice, if the battery power is smaller than a preset power threshold; and
   determining that the recommendation information category is picture, text or webpage, if the battery power is greater than the preset power threshold.

2. The method according to claim 1, wherein the obtaining a recommendation information group pre-uploaded to a server by a peer user comprises:
   querying in the server based on a user ID of the peer user so as to determine whether the peer user is in a preset recommendation user group; and
   obtaining the recommendation information group from the server if the peer user is in the recommendation user group.

3. The method according to claim 1, further comprising:
   obtaining from the server an information recommending period parameter preset by the peer user and determining whether to obtain the recommendation information group pre-uploaded to the server by the peer user according to the information recommending period parameter, before obtaining the recommendation information group pre-uploaded to the server by the peer user.

4. The method according to claim 1, wherein the determining a recommendation information category to be recommended according to a real-time state of a mobile terminal of a local user comprises:
   determining whether the mobile terminal of the local user is connected with an earphone;
   determining that the recommendation information category is music or voice, if the mobile terminal of the local user is connected with the earphone; and
   determining that the recommendation information category is picture, text or webpage, if the mobile terminal of the local user is not connected with the earphone.

5. The method according to claim 1, wherein the determining a recommendation information category to be recommended according to a real-time state of a mobile terminal of a local user comprises:
   detecting a spatial distance between the mobile terminal of the local user and a front obstacle;
   determining that the recommendation information category is music or voice, if the spatial distance is smaller than a preset distance threshold; and
   determining that the recommendation information category is picture, text or webpage, if the spatial distance is greater than the preset distance threshold.

6. The method according to claim 1, wherein the determining of a recommendation information category to be recommended according to a real-time state of a mobile terminal of a local user comprises:
   detecting screen display brightness of the mobile terminal of the local user;
   determining that the recommendation information category is music or voice, if the screen display brightness is smaller than a preset brightness threshold; and
   determining that the recommendation information category is picture, text or webpage, if the screen display brightness is greater than the preset brightness threshold.

7. The method according to claim 1, further comprising:
   executing a predetermined action according to an operation of the local user on the recommendation information, after selecting recommendation information for recommending from the recommendation information group according to the recommendation information category.

8. A device for pushing information during a call, comprising:

at least one processor; and a memory storing instructions, which when executed by the at least one processor, cause the at least one processor to perform operations, the operations comprising:

obtaining a recommendation information group pre-uploaded to a server by a peer user before the call is answered or hung up;

identifying a real-time state of a mobile terminal of a local user;

determining a recommendation information category to be recommended according to the identified real-time state of the mobile terminal of the local user; and selecting recommendation information for recommending from the recommendation information group according to the recommendation information category;

wherein the local user is a calling party and the peer user is a called party; or the local user is a called party and the peer user is a calling party, wherein the determining a recommendation information category to be recommended according to a real-time state of a mobile terminal of a local user comprises:

detecting battery power of the mobile terminal of the local user;

determining that the recommendation information category is music or voice, if the battery power is smaller than a preset power threshold; and determining that the recommendation information category is picture, text or webpage, if the battery power is greater than the preset power threshold.

9. The device according to claim 8, wherein the obtaining a recommendation information group pre-uploaded to a server by a peer user comprises:

querying in the server based on a user ID of the peer user so as to determine whether the peer user is in a preset recommendation user group; and obtaining the recommendation information group from the server when the peer user is in the recommendation user group.

10. The device according to claim 8, wherein the operations further comprise:

obtaining from the server an information recommending period parameter preset by the remote user and determine whether to obtain the recommendation information group pre-uploaded to the server by the peer user according to the information recommending period parameter, before the recommendation information group pre-uploaded to the server by the peer user is obtained.

11. The device according to claim 8, wherein the determining a recommendation information category to be recommended according to a real-time state of a mobile terminal of a local user comprises:

determining whether the mobile terminal of the local user is connected with an earphone;

determining that the recommendation information category is music or voice, if the mobile terminal of the local user is connected with an earphone; and determining that the recommendation information category is picture, text or webpage, if the mobile terminal of the local user is not connected with an earphone.

12. The device according to claim 8, wherein the determining a recommendation information category to be recommended according to a real-time state of a mobile terminal of a local user comprises:

detecting a spatial distance between the mobile terminal of the local user and a front obstacle;

determining that the recommendation information category is music or voice, if the spatial distance is smaller than a preset distance threshold; and determining that the recommendation information category is picture, text or webpage, if the spatial distance is greater than the preset distance threshold.

13. The device according to claim 8, wherein the determining of a recommendation information category to be recommended according to a real-time state of a mobile terminal of a local user comprises:

detecting screen display brightness of the mobile terminal of the local user;

determining that the recommendation information category is music or voice, if the screen display brightness is smaller than a preset brightness threshold; and determining that the recommendation information category is picture, text or webpage, if the screen display brightness is greater than the preset brightness threshold.

14. The device according to claim 8, wherein the operations further comprise:

executing a predetermined action according to an operation of the user on the recommendation information, after the recommendation information is selected for recommending from the recommendation information group according to the recommendation information category.

15. A non-transitory computer storage medium comprising one or more computer executable instructions, the one or more computer executable instructions when executed by a computer processor, causing the computer processor to perform execute a method for pushing information during a call, wherein the method comprises:

obtaining a recommendation information group pre-uploaded to a server by a peer user before the call is answered or hung up;

identifying a real-time state of a mobile terminal of a local user;

determining a recommendation information category to be recommended according to the identified real-time state of the mobile terminal of the local user; and selecting recommendation information for recommending from the recommendation information group according to the recommendation information category;

wherein the local user is a calling party and the peer user is a called party; or the local user is a called party and the peer user is a calling party, wherein the determining a recommendation information category to be recommended according to a real-time state of a mobile terminal of a local user comprises:

detecting battery power of the mobile terminal of the local user;

determining that the recommendation information category is music or voice, if the battery power is smaller than a preset power threshold; and determining that the recommendation information category is picture, text or webpage, if the battery power is greater than the preset power threshold.

* * * * *